Oct. 31, 1950      H. H. DOE      2,528,301
VENTILATING DEVICE
Filed Nov. 24, 1945      2 Sheets-Sheet 1
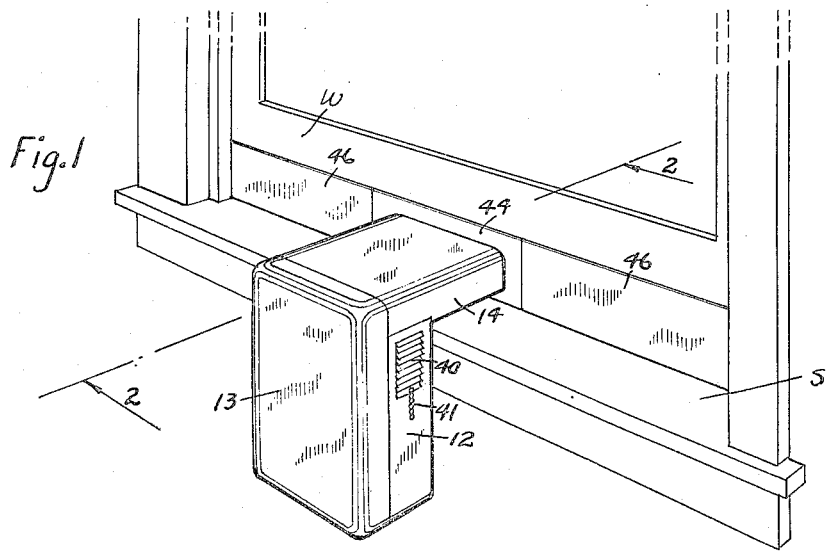
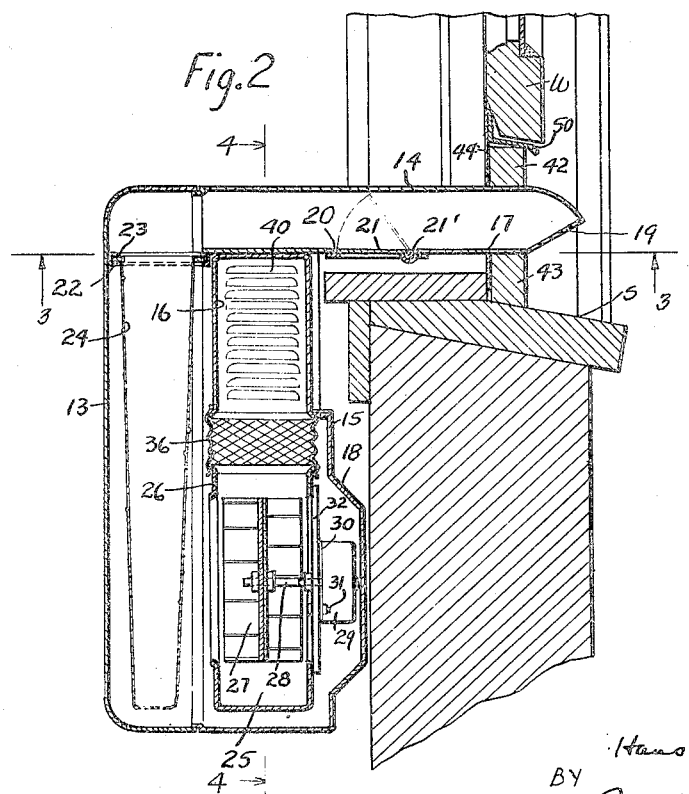
INVENTOR
Hans H. Doe
BY Juarles & French
ATTORNEYS

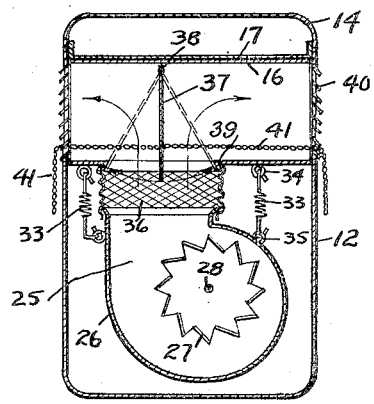
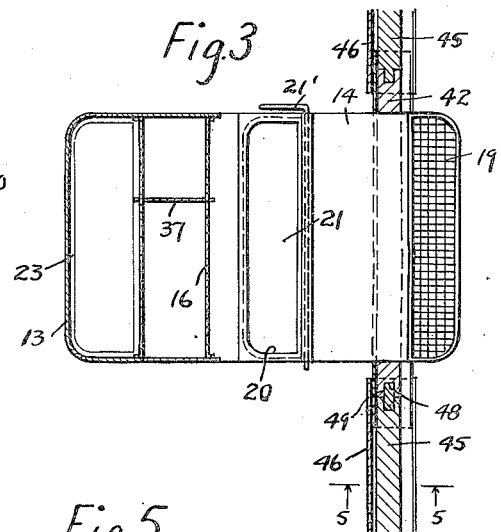
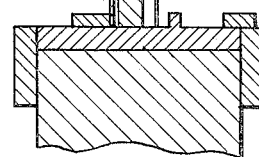
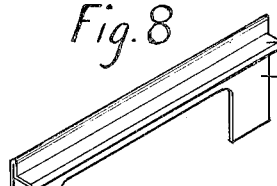
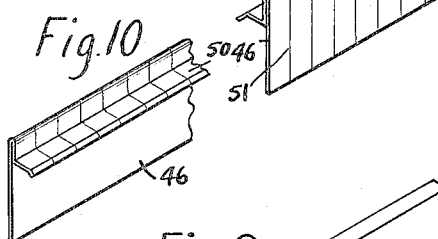
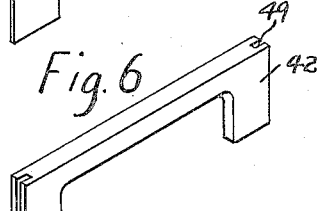
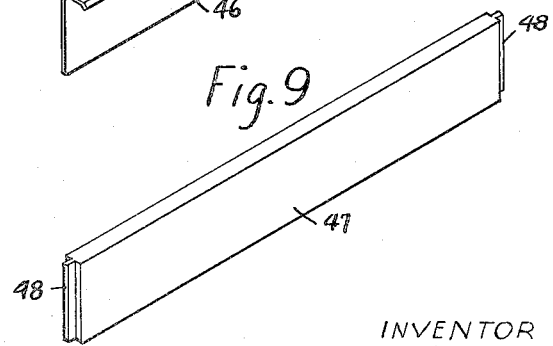
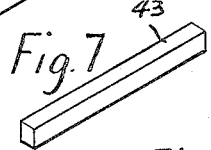
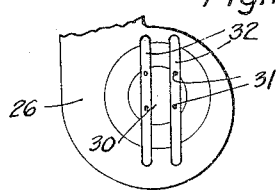

Patented Oct. 31, 1950

2,528,301

UNITED STATES PATENT OFFICE 2,528,301

VENTILATING DEVICE

Hans H. Doe, Milwaukee, Wis.

Application November 24, 1945, Serial No. 630,645

6 Claims. (Cl. 98—94)

The invention relates to air filtering apparatus.

Air filters as at present constructed are large and cumbersome and expensive to manufacture. The general object of this invention is to provide a filtering apparatus adapted for general application to rooms provided with windows which may be made on a quantity production basis at low cost.

One of the objects of the invention is to provide an air filtering apparatus having a housing of L-shaped form hung entirely from the window sill by its duct which is positioned in place between the window and sill by novel attachments which are formed so as to provide for a minimum amount of skill and labor for installation.

A further object of the invention is to provide an air filtering apparatus which though relatively small has a very large amount of filtering space afforded by a bag type filter disposed in a space in front of the motor driven blower or suction fan.

A further object of the invention is to provide an air filtering apparatus in which the inlet duct acts as the suspending arm or beam, the air passes through this duct and filter into the blower housing and is delivered thereby through a duct having oppositely disposed outlets, the inlet duct having a valve to permit recirculation of air and control the amount of air recirculated.

A further object of the invention is to provide an air filtering apparatus in which the blower and its drive motor are yieldingly suspended in the housing in such a way as to prevent any vibrations set up by the motor from being transmitted to the housing.

The invention further consists in the several features hereinafter set forth and more particularly defined by claims at the conclusion hereof.

In the drawings:

Fig. 1 is a perspective view of an apparatus embodying the invention;

Fig. 2 is a vertical sectional view taken on the line 2—2 of Fig. 1;

Fig. 3 is a horizontal sectional view taken on the line 3—3 of Fig. 2, parts being broken away;

Fig. 4 is a detailed vertical sectional view taken on the line 4—4 of Fig. 2;

Fig. 5 is a detailed vertical sectional view taken on the line 5—5 of Fig. 3;

Fig. 6 is a perspective view of one of the mounting members;

Fig. 7 is a perspective view of another mounting member;

Fig. 8 is a perspective view of the covering member for the mounting members shown in Figs. 6 and 7;

Fig. 9 is a perspective view of a filler member;

Fig. 10 is a perspective front view of a covering member for said filler member;

Fig. 11 is a perspective back view of the covering member shown in Fig. 10.

Fig. 12 is a view of the front end of the blower housing with the motor removed.

The apparatus includes an L-shaped enclosing casing 12, open at its front and provided at said front with a removable front cover member 13.

The casing 12 is formed of sheet metal to provide an inlet duct 14, a motor and blower housing 15, and a discharge duct 16. The top portion and sides of the duct 14 and the sides and bottom of the housing 15 may be formed of a single piece of sheet metal to which is suitably secured by spot welding the bottom portion 17 of the duct 14, the front side 18 of the housing and the discharge duct 16.

The inlet duct 14 is provided with a screen 19 at its entrance end and is of such a length that it will allow the housing 15 and duct 16 to project down below window sills of varying widths. The bottom of the duct 14 is provided with an opening 20 controlled by a damper or valve 21 pivotally mounted by a manually controlled rod 21' on said duct, and when open, permitting air from the room to enter said duct.

The back cover member 13 is provided with an angled frame 22 to receive the top carrying frame 23 of a bag type filter 24 which hangs down in the cover in the rear of the blower 25. The bag type filter 24 provides a far greater filtering area than is usual in devices of this kind and doubles the filtering area as compared to the usual plate type filter.

The blower 25 includes a volute casing 26 and the centrifugal cage type blower fan 27 mounted on the shaft 28 of an electric motor 29 which is provided with a mounting base 30 secured by bolts 31 to spaced frame members 32 secured to the casing 26. The blower is spring supported or hung from the housing 15 by tension springs 33 having hooked ends engaging eyes 34 and 35 secured, respectively, to the lower side of the duct 16, forming the top of the housing 15, and the blower casing. A flexible conduit 36 of fabric, rubber, or other suitable material connects the outlet of the blower with the discharge duct 16. When the motor is running, all vibration therefrom is absorbed by the springs and the flexible conduit.

A director or distributor valve 37 is pivotally mounted at its upper end 38 in the duct 16 and cooperates with the inlet opening 39 to the duct 16 to direct the air either through both the louvered outlet openings 40 for said duct or through one of said openings or a greater part of the air from one of said openings than the other. For regulating the position of the valve 37, pull chains 41 connected with the lower end thereof pass through the outlets of said duct 16 and hang down below the same on the outside of the housing. Thus the air forced out by the fan may be distributed to different portions of the room to be ventilated.

Outside air or inside air or a mixture thereof is drawn by the fan 27 through the duct 14, bag filter 24, housing 15 into the blower casing 26 and is expelled by the fan or blower through said duct 16.

For clamping the apparatus between the window W and its sill S, I provide mounting members, 42 and 43, a cover member 44 therefor, and spacer and filler members 45 with cover members 46 therefor. All that is necessary to install the device is a wood saw.

The position of the device relative to the window having been determined, a member 47 is sawed in two to provide filler members 45 of the desired length, and the tenoned ends 48 of these members are fitted into grooves 49 of the arch-shaped mounting member 42 which is formed to engage over the front portion of the duct 14, the bottom of said duct adapted to rest on the mounting block member 43 which is of a length to fit the sides of the arc. The cover member 44 of sheet metal is arch-shaped to fit over the member 42 and the duct and has an outwardly projecting weather shedding flange 50. The members 45 have similar sheet metal cover members 46 which for convenience may be scored as indicated at 51, so that they may be broken off to the desired length and then positioned over the members 45.

With the members 42, 43, and 45 and their cover members positioned in the window opening the duct is positioned in the opening formed by the members 42 and 43, and the window S is then lowered to clamp the duct portion 14 of the apparatus between said parts and hold the filler members 45 between the window and its sill.

I desire it to be understood that this invention is not to be limited to any particular form or arrangement of parts except in so far as such limitations are included in the claims.

What I claim as my invention is:

1. In an apparatus of the character described, the combination of an enclosing L-shaped casing having an outwardly projecting casing-suspending inlet duct portion at its top, means to clamp said duct portion between a window and its sill with the remainder of the casing suspended by said duct portion below said sill in the room to be ventilated, said casing having a motor driven blower supported therein below said duct, said blower having an inlet and an outlet, a discharge duct in said casing leading from the outlet of said blower into the room to be ventilated, a filtering compartment in said casing connecting said inlet duct with the inlet of said blower, and a bag type filter mounted in said filtering compartment and extending from said duct to a point adjacent the bottom of said casing.

2. In an apparatus of the character described, the combination of an enclosing L-shaped casing having a removable front cover and provided at its top with a laterally projecting inlet duct portion for wholly suspending the casing by said duct between a window and its sill within the room to be ventilated, said cover forming a part of the discharge end of said inlet duct, a bag filter removably mounted in said back cover and opening at its top into the outlet of said inlet duct and extending to a point adjacent the bottom of said cover, a blower mounted in said enclosing casing below said duct and having its inlet connected with the space in said cover in which said bag is mounted to draw air through said filter, and a discharge passage for said blower including a flexible conduit section and a discharge duct connected thereto to discharge air into the room to be ventilated.

3. In an apparatus of the character described, the combination of an L-shaped enclosing casing having an outwardly projecting casing-suspending inlet duct portion, means to clamp said duct portion between a window and its sill with the remainder of said casing suspended by said duct portion below the sill in the room to be ventilated, a motor driven blower in said casing below said duct portion, a filter containing passage in said casing connecting said inlet duct with said blower, a discharge passage from said blower having outlets in opposite sides of said casing, and means to control the flow of air through said outlets.

4. In an apparatus of the character described, the combination of an enclosing casing having an outwardly projecting casing-suspending inlet duct portion and a discharge duct, a motor driven fan in said casing to draw air through said inlet duct and force it through said discharge duct, and means to position said casing between a window and its sill comprising an arched member extending over said inlet duct portion and a base block cooperating therewith to clamp said inlet duct portion between said window and sill, filler members extending from said arched member to the sides of the window and having rabbeted joint connections therewith, and cover members for said arched member and filler members with downwardly directed weathering flanges.

5. In an apparatus of the character described, the combination of an enclosing casing open at its front side and having a laterally projecting casing suspending inlet duct portion at its top extending to said front side, a discharge duct adjacent the back of said casing, and a compartment in said casing below said discharge duct and communicating with said open side, a cover for said open front side cooperating with said discharge duct and said inlet duct to form a connecting conduit between said inlet duct and said compartment, a filter bag mounted in said conduit, and a fan mounted in said compartment for drawing air through said inlet duct, said filter and said conduit, and discharging it into said discharge duct.

6. In an apparatus of the character described, the combination of an enclosing casing open at its front side and having a laterally projecting casing suspending inlet duct portion at its top extending to said front side, a discharge duct underlying a portion of said inlet duct, and a compartment opening at one side into said front side and having an outlet connected with said discharge duct, a cover for the open side of said casing cooperating with said inlet duct and said discharge duct to form a connecting conduit between said inlet duct and said compartment, a filter bag mounted in said cover, and a fan mounted in said compartment for drawing air through said inlet duct, said filter and said conduit, and discharging it into said discharge duct.

HANS H. DOE.

REFERENCES CITED

The following references are of record in the file of this patent:

UNITED STATES PATENTS

| Number | Name | Date |
|---|---|---|
| 1,695,804 | Feinberg | Dec. 18, 1928 |
| 1,821,202 | Birkholz | Sept. 1, 1931 |
| 1,924,489 | Ferris | Aug. 29, 1933 |
| 1,931,227 | Kaiser | Oct. 17, 1933 |
| 1,938,798 | Bourne | Dec. 12, 1933 |
| 1,946,887 | Sipe | Feb. 13, 1934 |
| 1,992,112 | Allen | Feb. 19, 1935 |
| 2,035,653 | Haskell | Mar. 31, 1936 |
| 2,081,109 | Kilb | May 18, 1937 |
| 2,135,461 | Woolley | Nov. 1, 1938 |
| 2,148,105 | Barrows et al. | Feb. 21, 1939 |
| 2,214,467 | Lambert et al. | Sept. 10, 1940 |
| 2,293,432 | Friedman | Aug. 18, 1942 |
| 2,322,904 | Williams | June 29, 1943 |